US012697844B2

(12) United States Patent (10) Patent No.: US 12,697,844 B2

Mungara et al. (45) Date of Patent: Aug. 4, 2026

(54) METHOD AND SYSTEM FOR AUTOMATED INFLATION AND DEFLATION OF TIRES IN AN AUTOMOBILE

(71) Applicant: PES UNIVERSITY, Bengaluru (IN)

(72) Inventors: Ananya Mungara, Bengaluru (IN); Tarakesh Mogallapalli, Bengaluru (IN); Namratha Venkata Reddy, Bengaluru (IN); Manjunath Gangadhar, Bengaluru (IN)

(73) Assignee: PES UNIVERSITY, Bengaluru (IN)

( * ) Notice: Subject to any disclaimer, the term of this patent is extended or adjusted under 35 U.S.C. 154(b) by 393 days.

(21) Appl. No.: 18/328,877

(22) Filed: Jun. 5, 2023

(65) Prior Publication Data

US 2024/0198737 A1 Jun. 20, 2024

(51) Int. Cl.
B60C 23/00 (2006.01)

(52) U.S. Cl.
CPC .............................. B60C 23/00354 (2020.05)

(58) Field of Classification Search
CPC ................ B60C 23/001; B60C 23/003; B60C 23/00354; B60C 23/0408; B60C 23/0474; B60C 23/0479
See application file for complete search history.

(56) References Cited

U.S. PATENT DOCUMENTS

| | | | |
|---|---|---|---|
| 7,975,739 B1 | 7/2011 | Ingram | |
| 8,402,988 B2 | 3/2013 | Campau | |
| 9,248,707 B2 | 2/2016 | Zhou et al. | |
| 11,673,432 B2 * | 6/2023 | Kakihara | B60W 10/14 |
| | | | 152/416 |
| 2016/0068033 A1 * | 3/2016 | Ingram | B60C 23/00354 |
| | | | 152/416 |

* cited by examiner

*Primary Examiner* — Jason R Bellinger
(74) *Attorney, Agent, or Firm* — Riyon Harding

(57) ABSTRACT

An apparatus for inflation and deflation of tires of an automobile is disclosed. The apparatus includes an air pressure source to store the air and a valve bank having a solenoid valve for each tire of the automobile to control the flow of air from the air pressure source based on a control signal received from inflation and deflation system. Further, the apparatus includes an air control unit installed on each tire to receive air from the air pressure source via the corresponding solenoid valve. The air control unit has a central pipe to receive air pressure to press a valve stem of the tire and a surrounding pipe to facilitate ingress and egress of air into the tire and out of the tire for inflation and deflation, respectively.

20 Claims, 8 Drawing Sheets

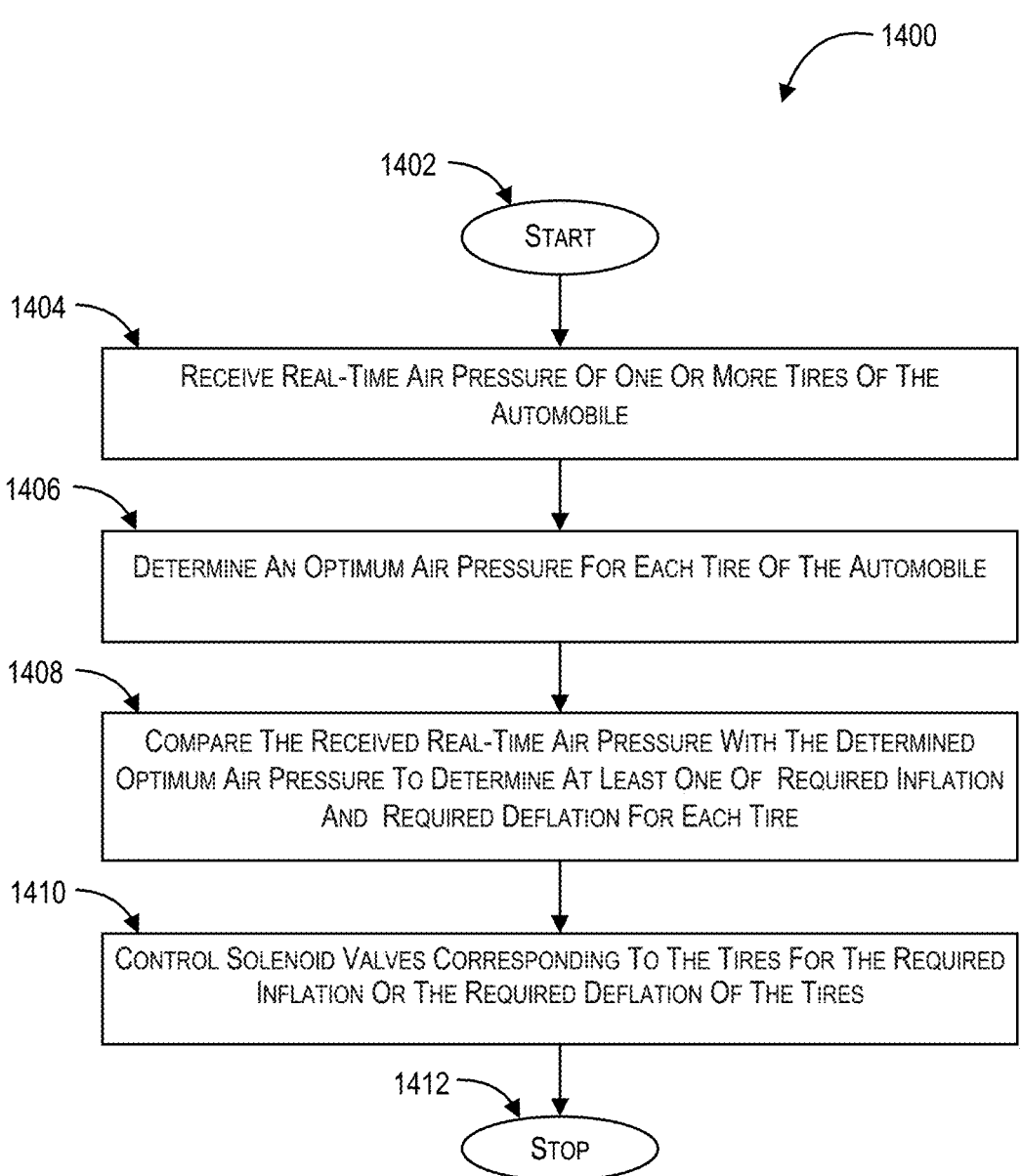

1400

1402 — START

1404 — RECEIVE REAL-TIME AIR PRESSURE OF ONE OR MORE TIRES OF THE AUTOMOBILE

1406 — DETERMINE AN OPTIMUM AIR PRESSURE FOR EACH TIRE OF THE AUTOMOBILE

1408 — COMPARE THE RECEIVED REAL-TIME AIR PRESSURE WITH THE DETERMINED OPTIMUM AIR PRESSURE TO DETERMINE AT LEAST ONE OF REQUIRED INFLATION AND REQUIRED DEFLATION FOR EACH TIRE

1410 — CONTROL SOLENOID VALVES CORRESPONDING TO THE TIRES FOR THE REQUIRED INFLATION OR THE REQUIRED DEFLATION OF THE TIRES

1412 — STOP

METHOD AND SYSTEM FOR AUTOMATED INFLATION AND DEFLATION OF TIRES IN AN AUTOMOBILE

BACKGROUND

Technical Field

The present disclosure relates to the field of tire management system for automobiles, and in particular, relates to a system and method for automated inflation and deflation of tires in an automobile.

Description of the Related Art

Automobiles such as multi-wheeler vehicles including bikes, scooters, auto-rickshaws, cars, trucks, and buses, have a plurality of tires filled with air (e.g., a mixture of gases or an inert gas like nitrogen). Typically, the air must be filled in the tires to a specific air pressure that can be selected based on fuel economy, terrain type, temperature of the tires, distance to be travelled, and so on. However, the tires of the automobiles tend to leak air with time, leading to reduced air pressure that poses safety risks (e.g., poor vehicle handling), reduced fuel efficiency, increased emissions, and increased tire wear. Therefore, a user (e.g., a driver) must regularly check the air pressure in the tires and refill it when it is low to avoid such issues while driving. However, such manual checking is not always accurate.

Therefore, the tire management systems are used in the automobiles to keep an automatic check of the air pressure in the tires and send notifications (e.g., on the dashboard of the automobile) to the user when the air pressure is low. Accordingly, the user must stop the automobile and manually take care of the tire inflation that causes inconvenience to the user. In some conventional systems, the user may be provisioned to initiate and control the inflation of the tires from the dashboard. In such cases, the inflation may commence only after the user initiates the inflation process, upon which a pin that is mechanically movable pushes a pin of the valve stem of the tire to fill the air. However, such mechanically moving pins are prone to damage over time and require replacement which adds additional cost to tire maintenance.

Additionally, during long journeys, the tires of the automobile tend to heat up that increases the air pressure in the tires drastically. Such increased air pressure typically leads to tire bursts which is a common cause of accidents. However, the conventional systems for inflation of the tires fail to handle such issues of increased air pressure and are merely limited to issues of reduced air pressure.

Thus, there is a need for an improved system and method for automobiles to inflate and deflate the tire automatically on the go without an intervention of the user and overcome the drawbacks of the conventional tire management systems.

BRIEF SUMMARY

One or more embodiments a system and an apparatus for automatic inflation and deflation of tires of an automobile.

An embodiment of the present disclosure discloses a system for automatic inflation and deflation of tires of an automobile. The automated system includes a receiver module to receive real-time air pressure data from one or more tires of the automobile via a respective sensor installed in each of the one or more tires. The automobile corresponds to a vehicle having one or more wheels and includes at least one of a bike, a scooter, an auto-rickshaw, a car, a truck, and a bus.

In some embodiments, the automated system includes an analyzer module to determine an optimum air pressure for each of the one or more tires of the automobile based at least on one of user data and automobile data. The user data includes at least one of desired air pressure values, a terrain type, a potential distance to be travelled, and a driving mode of the automobile. Further, the automobile data includes at least one of historical values of air pressure in the tires, a standard air pressure value for the tires, a driving mode of the automobile, a real-time automobile speed, details pertaining to tire-ground contact, real-time Global Positioning System (GPS) co-ordinates of the automobile, real-time weather details, and details pertaining to a destination of a journey. In one embodiment of the present disclosure, determining the optimum air pressure for each of the one or more tires of the automobile includes employing an Artificial Intelligence (AI) model over the received automobile data, the user data, or a combination thereof. In another embodiment of the present disclosure, determining the optimum air pressure for each of the one or more tires of the automobile includes fetching, from a database, a pre-stored optimum air pressure for each of the one or more tires based on one of the received automobile data and the user data.

Further, the analyzer module compares the received real-time air pressure with the determined optimum air pressure for each of the one or more tires to determine at least one of a required inflation and a required deflation for the one or more tires of the automobile. The analyzer module further determines that a tire needs inflation and deflation when the received real-time air pressure is less and more than the optimum air pressure value, respectively. In an embodiment, the required inflation and the required deflation is a difference between the received real-time air pressure and the determined optimum air pressure for each of the one or more tires.

In some embodiments, the automated system also includes a control module to control, based on the results of comparison, one or more solenoid valves corresponding to the one or more tires for at least one of the required inflation and the required deflation of the one or more tires of the automobile via respective air control units having a central pipe and a surrounding pipe over the central pipe. For deflation of a tire, the corresponding solenoid valve passes an air pressure through the central pipe to press a valve stem of the tire, such that the air pressure from the tire egresses via the surrounding pipe. For inflation of the tire, the corresponding solenoid valves pass an air pressure through both the central pipe and the surrounding pipe to press the valve stem and refill the air, respectively.

In some embodiments, the air control unit includes a piston inside the central pipe that is aligned with the valve stem of the tire, such that when the corresponding solenoid valve passes the air pressure through the central pipe then the piston moves forward to press the valve stem of the tire that automatically deflates the tire by egressing the air pressure through the surrounding pipe. During the inflation, the corresponding solenoid valve passes the air pressure through the central pipe and the surrounding pipe, such that the air pressure through the central pipe moves the piston forward to press the valve stem of the tire, and the air pressure through the surrounding pipe inflates the tire.

In some embodiments, the automated system includes a decision module to determine the one or more solenoid valves of a valve bank that needs to be controlled based on the results of the comparison. Further, the automated system includes a notification module to provide one or more notifications to a user via an application installed on at least one of a user device and a dashboard system of the automobile. The one or more notifications are associated with at least one of the received real-time air pressure of the one or more times of the automobiles, details about the inflation and deflation, manually controlling the inflation and deflation, issues with the one or more tires, optimum speeds to be maintained during the inflation and deflation.

An embodiment of the present disclosure discloses an apparatus for inflation and deflation of tires of an automobile. The apparatus includes an air pressure source to store the air for inflation and deflation of the tires. Further, the apparatus includes a valve bank having a solenoid valve for each tire of the automobile, wherein the solenoid valve controls the flow of air from the air pressure source based on a control signal received from a system for automatic inflation and deflation of tires. The apparatus also includes an air control unit installed on each tire of the automobile to receive air from the air pressure source via the corresponding solenoid valve. The air control unit further includes a central pipe to receive air pressure from the corresponding solenoid valve to press a valve stem of the tire and a surrounding pipe over the central pipe to facilitate ingress and egress of air into the tire and out of the tire for inflation and deflation, respectively. For deflation of a tire, the corresponding solenoid valve passes an air pressure through the central pipe to press a valve stem of the tire, such that the air pressure from the tire egresses via the surrounding pipe. For inflation of the tire, the corresponding solenoid valves pass an air pressure through both the central pipe and the surrounding pipe to press the valve stem and refill the air.

The features and advantages of the subject matter here will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 7-13 illustrate various exemplary implementations of a tire management application, in accordance with an embodiment of the present disclosure;

FIG. 14 illustrates a flowchart of an automated method for inflation and deflation of tires of an automobile, in accordance with an embodiment of the present disclosure.

Figures 1, 2:
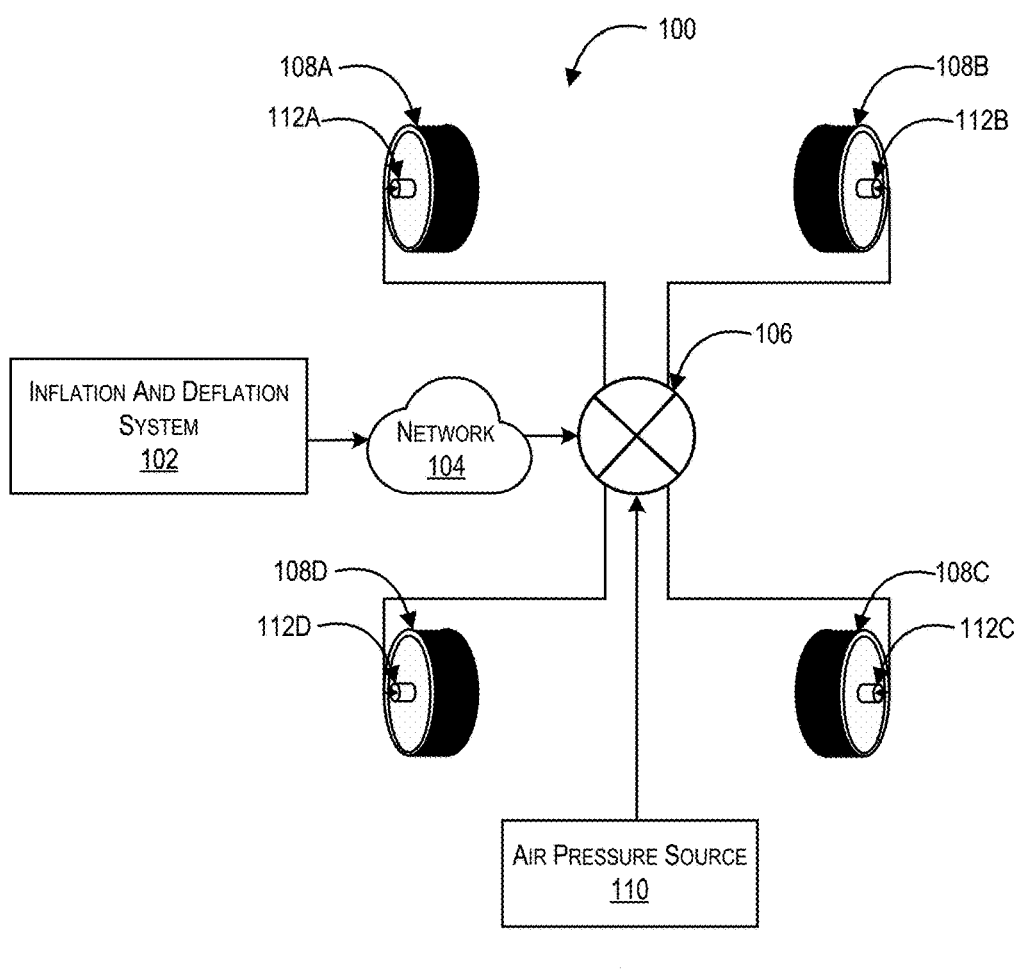
FIG. 1 illustrates an exemplary environment of an inflation and deflation system of tires of an automobile, in accordance with an embodiment of the present disclosure.
FIG. 2 illustrates a block diagram of the inflation and deflation system of tires of the automobile, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system and an apparatus for automatic inflation and deflation of tires of an automobile. The automated system includes receiving real-time air pressure data from one or more tires of the automobile via a respective sensor installed in each of the one or more tires. In some embodiments, the automated system includes determining an optimum air pressure for each of the one or more tires of the automobile based at least on one of user data and automobile data. In some embodiments, the automated system includes comparing the received real-time air pressure with the determined optimum air pressure for each of the one or more tires to determine at least one of a required inflation and a required deflation for the one or more tires of the automobile. In some embodiments, the automated system includes controlling, based on the results of comparison, one or more solenoid valves corresponding to the one or more tires for at least one of the required inflation and the required deflation of the one or more tires of the automobile via respective air control units. Each of the air control units includes a central pipe and a surrounding pipe over the central pipe. In one instance, for deflation of a tire, the corresponding solenoid valve passes an air pressure through the central pipe to press a valve stem of the tire, such that the air pressure from the tire egresses via the surrounding pipe. In another instance, for inflation of the tire, the corresponding solenoid valves passes an air pressure through both the central pipe and the surrounding pipe to press the valve stem and refill the air, respectively.

FIG. 1 illustrates an exemplary environment 100 of an inflation and deflation system 102 for tires of an automobile, in accordance with an embodiment of the present disclosure. Such environment 100 may be associated with the automobile. The automobile, for the purpose of the disclosure, may correspond to a vehicle having one or more wheels including, without any limitation, a bike, a scooter, an auto-rickshaw, a car, a truck, and a bus. It may be noted that each wheel may include a tire 108, for example, a car having 4 wheels may have 4 tires 108A, 108B, 108C, 108D (hereinafter may also be termed as one or more tires 108), as illustrated in FIG. 1. Further, it may be noted that such tires 108 may be made of a flexible material (e.g., rubber) and may be filled with air (e.g., a mixture of gases or an inert gas like nitrogen). In an illustrated embodiment, the environment 100 may include the inflation and deflation system 102 (hereinafter may also be termed as an automated system 102), a network 104, a valve bank 106, an air pressure source 110, and an air control unit 112 installed each tire 108, for example, a car having 4 tires 108A, 108B, 108C, 108D may have 4 separate air control units 112A, 112B, 112C, 112D, as illustrated in FIG. 1.

In some embodiments, the automated system 102 may be implemented on a user device including, without any limitation, a mobile phone, a computer, a tablet, and a dashboard of the automobile. The automated system 102 may be communicatively coupled to the automobile via the network 104 to receive relevant data for controlling air pressure in the tires 108 and sending control signal(s) to inflate or deflate the tires 108. In one embodiment, the network 104 may be a wireless network such as Bluetooth, Wireless Fidelity (Wi-Fi), Global System for Mobile Communication (GSM), ZigBee, and Infrared (IR) network. In another embodiment, the network 104 may include a wired network connection, such as wire based Local Area Network (LAN). In some embodiments, the automated system 102 may receive real-time air pressure of the tires 108 of the automobile and may identify whether any tire 108 requires inflation or deflation. Based on such identification, the automated system 102 directs one or more solenoid valves of the valve bank 106 to control or modulate the flow of air from the air pressure source 110 to the tire 108.

It may be noted that the one or more solenoid valves of the valve bank 106 provides a reliable and efficient solution for controlling the flow of air in the automated system 102 to ensure that the air pressure of the tires 108 is maintained. Further, a rotary union may facilitate a connection between a stationary end and a rotating end for the smooth and uninterrupted flow of air between the air pressure source 110 and the tire 108 during the inflation and deflation process. The rotary union may include a stationary end connected to the solenoid valve of the valve bank 106 and a rotating end connected to the tire 108. Accordingly, the rotary union in the automated system 102 ensures that the pneumatic connections remain intact, even when the tire is rotating, thereby avoiding any potential air leakages, and maintaining the desired tire pressure levels.

FIG. 2 illustrates a block diagram 200 of the automated system 102 for inflation and deflation of the tires 108 of the automobile, in accordance with an embodiment of the present disclosure. In an embodiment of the present disclosure, the automated system 102 may include a receiver module 202, an analyzer module 204, a decision module 206, a control module 208, a notification module 210, and a database 212. The receiver module 202, the analyzer module 204, the decision module 206, the control module 208, the notification module 210, and the database 212 may be communicatively coupled to a memory and a processor of the automated system 102. The processor may control the operations of the receiver module 202, the analyzer module 204, the decision module 206, the control module 208, the notification module 210, and the database 212. In an embodiment of the present disclosure, the processor and the memory may form a part of a chipset installed in the automated system 102. In another embodiment of the present disclosure, the memory may be implemented as a static memory or a dynamic memory. In an example, the memory may be internal to the automated system 102, such as an onside-based storage. In another example, the memory may be external to the automated system 102, such as cloud-based storage. Further, the processor may be implemented as one or more microprocessors, microcomputers, digital signal processors, central processing units, state machines, logic circuitries, and/or any devices that manipulate signals based on operational instructions.

In some embodiments, the receiver module 202 receives real-time air pressure data from the one or more tires 108 of the automobile. The real-time air pressure data may be received via respective sensor installed in each of the one or more tires 108. It may be noted that the real-time air pressure data may be automatically received from the one or more tires 108. Further, the receiver module 202 may also receive user data from a user and automobile data from the automobile. In some embodiments, the user may be provided one or more options on an application installed on the user device to input the user data. The user data may include, without any limitation, a desired air pressure value, a terrain type, a potential distance to be travelled, and a driving mode of the automobile. In some embodiments, the receiver module 202 may automatically fetch the automobile data from the database 212. The automobile data may include, without any limitation, historical values of air pressure in the tires 108, a standard air pressure value for the tires 108, a driving mode of the automobile, a real-time automobile speed, details pertaining to tire-ground contact, real-time Global Positioning System (GPS) co-ordinates of the automobile, real-time weather details, and details pertaining to destination of journey.

In some embodiments of the present disclosure, the analyzer module 204 may determine an optimum air pressure for each of the one or more tires 108 of the automobile based on the received user data (e.g., the user enters a 'mountain terrain' and the optimum air pressure for 'mountain terrain' may be 32 Bar), the automobile data (e.g., the vehicle running mode is 'sports mode' and the optimum air pressure for 'sports mode' may be 34 Bar), or a combination thereof. In one embodiment of the present disclosure, the analyzer module 204 determines the optimum air pressure for each of the one or more tires 108 of the automobile by employing an Artificial Intelligence (AI) model over one of the received automobile data and the user data. In another embodiment of the present disclosure, the analyzer module 204 determined the optimum air pressure for each of the one or more tires 108 of the automobile by fetching a pre-stored optimum air pressure for each of the one or more tires 108 from the database 212 based on the received automobile data and/or the user data.

Further, the analyzer module 204 may compare the received real-time air pressure with the determined optimum air pressure for each of the one or more tires 108. Based on the comparison the analyzer module 204 may determine a required inflation and a required deflation for the one or more tires 108 of the automobile. In one embodiment of the present disclosure, the analyzer module 204 determines that the tire 108 needs inflation when the received real-time air pressure is less than a threshold air pressure value. In another embodiment of the present disclosure, the analyzer module 204 determines that the tire 108 needs deflation when the received real-time air pressure is more than the threshold air pressure value. Further, the required inflation and the required deflation may be a difference between the received real-time air pressure and the determined optimum air pressure for each of the one or more tires 108. For example, if the determined optimum air pressure for tire 1 108A and tire 2 108B is 32 Bar, and the real-time air pressure value for the tire 1 108A is 30 Bar and for tire 2 108B is 36 Bar, then the analyzer module 204 determines that tire 1 108A requires inflation of 2 Bar and tire 2 108B requires deflation of 4 Bar.

In some embodiments of the present disclosure, the decision module 206 determines the one or more solenoid valves of the valve bank 106 that need to be controlled based on the results of the comparison. In some embodiments of the present disclosure, the control module 208 controls the one or more solenoid valves of the valve bank 106 corresponding to the one or more tires 108 that require inflation or deflation. As such, the control module 208 may control the determined one or more solenoid valves by the decision module 206 based on the results of the comparison. In an embodiment of the present disclosure, the control module 208 may generate a time-specific control signal for the valve bank 106 to open or close the corresponding valves for a pre-specified time for the required inflation or the required deflation of the one or more tires 108 of the automobile.

In some embodiments, the notification module 210 may provide one or more notifications to the user via the application installed on the user device. The notification module 210 may be communicatively coupled to the receiver module 202, analyzer module 204, the control module 208, or a combination thereof. Accordingly, the one or more notifications sent by the notification module 210 may, without any limitation, include the received real-time air pressure of the one or more tires 108 of the automobile, details about the inflation and deflation, manually controlling the inflation and deflation, issues with the one or more tires 108, and optimum speeds to be maintained during the inflation and deflation.

For example, when the received data indicates that the air pressure of one or more tires 108 has dropped below the standard air pressure data, the notification module 210 may trigger an alert to the user. The alert may be in the form of a visual notification and/or an audible alarm to ensure that the user takes prompt action to rectify the issues. The notification module 210 can also provide information on the specific tire(s) 108 that require attention, allowing the driver to take appropriate action. In some embodiments, the notification module 210 is designed to provide real-time updates to the driver, ensuring that they are constantly informed about the status of their vehicle's tire pressure. The notification module 210 provides alerts both during and after the inflation or deflation process so that the driver can adjust their driving speed accordingly. Additionally, the notification module 210 may also provide recommendations for nearby service stations or tire repair centers in case the driver requires assistance in rectifying the issue.

Figure 3:
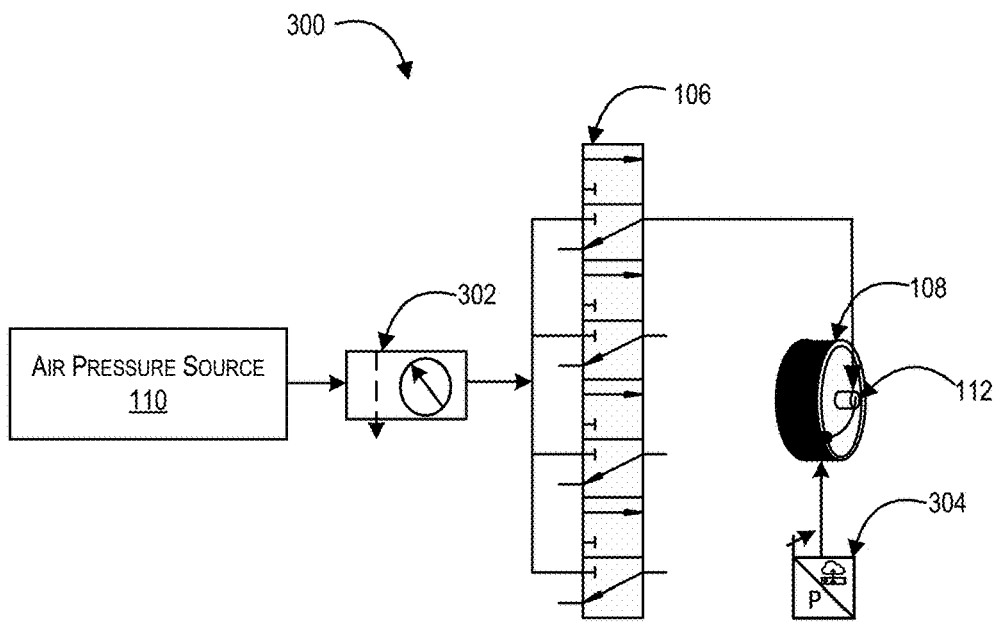
FIG. 3 illustrates an example of controlling air pressure of one tire of the automobile, in accordance with an embodiment of the present disclosure.

FIG. 3 illustrates an example 300 of controlling the air pressure of one tire 108 of the automobile, in accordance with an embodiment of the present disclosure. As illustrated, the air pressure source 110 is communicatively coupled to a Filtration, Regulation and Lubrication (FRL) unit 302 that is coupled to the solenoid valve bank 106 for inflation or deflation of the tire 108 via the corresponding air control unit 112. In some embodiments, the air pressure source may be a compressed air cylinder capable of storing up to 2.5 L to 10 L of air and may have a filter and regulator to regulate the flow of air during egression. Further, the FRL unit 302 may include a single stage air pressure regulator that reduces and/or controls the pressure inside the air pressure source to egress air pressure in one step. In an embodiment of the present disclosure, the FRL unit 302 has a ⅛th inch orifice and an operating pressure of 1-16 bar while having a standard flow rate of 3400 l/min.

In some embodiments, the valve bank 106 may include one or more solenoid valves used for directional, pressure, check, and flow control based on the real-time air pressure data received from one or more sensors 304 of each of the one or more tires 108. The valve bank 106 may be made up of materials such as aluminum, brass, stainless steel, and nitrile. The one or more solenoid valves may correspond to one or more 3/2 DC Valves consisting of one or more solenoid-controlled DC valves. In an embodiment of the present disclosure, each of the solenoid valve may have a separate coil, such as a 12V DC coil. In some embodiments, the coils of the solenoid valves may be connected to an electronic module such as but not limited to a Raspberry Pi or Arduino that may store the programmable instructions relating to the solenoid valves and dashboard.

In some embodiments of the present disclosure, the air control unit 112 may include the rotatory union that allows the transfer of air from stationary to rotating equipment, such as from the solenoid valves to the tires 108. It may be noted that each tire 108 in the automobile may be associated with a dedicated rotatory union that may be designed for a unique application based on media types, number of flow paths, temperatures, pressures, speeds, loads, and environments. In an embodiment of the present disclosure, the rotatory union may operate at speeds of up to 3000 RPM with a maximum air pressure of 100 PSI.

In some embodiments of the present disclosure, the rotatory union is placed on the tires 108 that are connected to the valve stem of the tires 108 using flanges. The rotary union may have two parts, including a stationary part and a rotating part, such that the air from the solenoid valves first passes through the stationary part, and then the air is transferred from the stationary part to the rotating part that is connected to the tire 108, which sends the air in regular intervals to inflate and deflate the tires 108.

Figure 4:
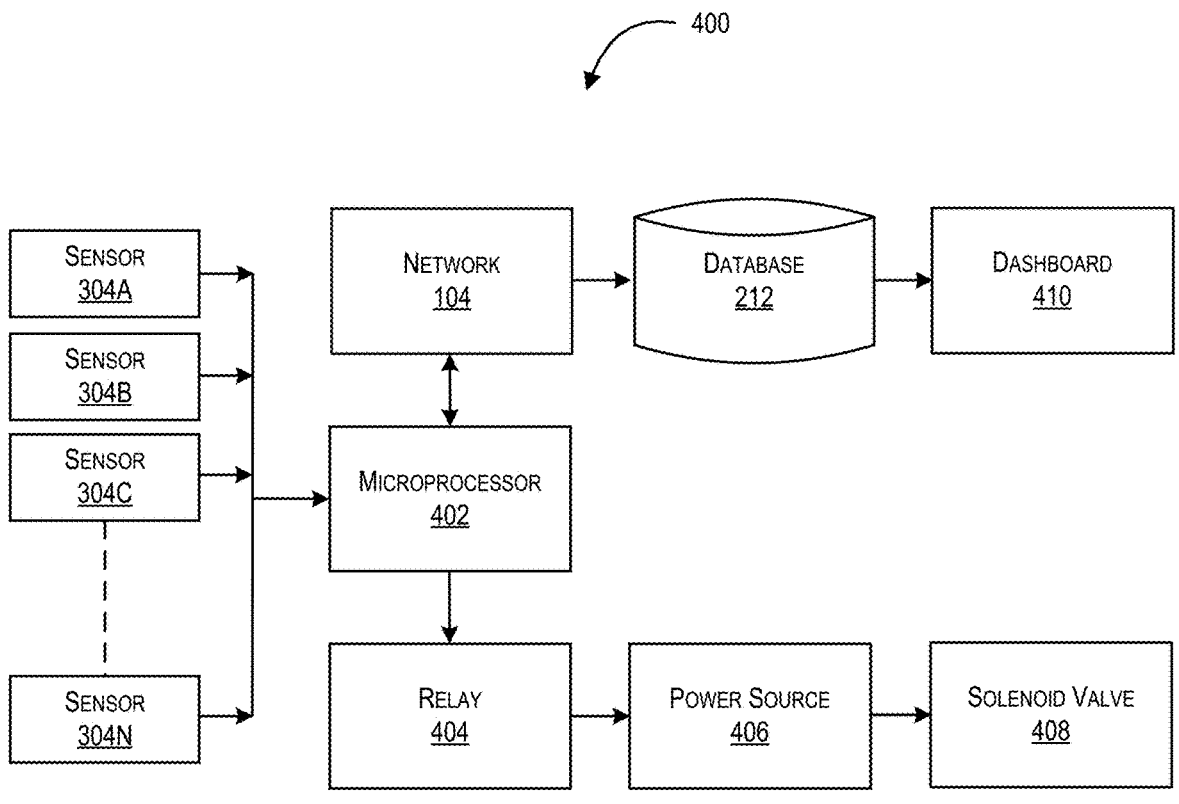
FIG. 4 illustrates an exemplary circuit diagram of the inflation and deflation system, in accordance with an embodiment of the present disclosure.

FIG. 4 illustrates an exemplary circuit diagram 400 of the automated system 102, in accordance with an embodiment of the present disclosure. The automated system 102 may include a microprocessor 402 to perform operation of one or more modules, as mentioned in previous paragraphs. It may be apparent to a person skilled in the art that instead of the microprocessor 402, a micro-controller may be utilized without departing from the scope of the disclosure. The microprocessor 402 may first receive the real-time air pressure values of the one or more tires 108 of the automobile via one or more sensors 304A, 304B, 304C, . . . 304N (collectively referred to as 304). Alternatively, or additionally, multiple microprocessors may be utilized to handle the sensor data from the one or more sensors 304 for reduced load on one microprocessor and faster overall processing, without departing from the scope of the disclosure. In an embodiment of the present disclosure, the one or more sensors 304 are placed on a rim of the tire 108 to sense the pressure and/or temperature inside the tire 108. Specifically, the one or more sensors 304 may monitor a pressure range of 0-80 psi and may operate on a 3-5V battery while having a battery life of up to 5 years. Upon receiving the real-time air pressure values of the one or more tires 108, the microprocessor 402 utilizes the network 104 to fetch an optimum air pressure value for the one or more tires 108. Thereafter, the microprocessor 402 may compare the received real-time values with the fetched optimum air pressure values to determine if the tire 108 requires inflation or deflation. In an embodiment, the microprocessor 402 may provide one or more notifications to the user device, such as the dashboard 410 of the automobile, to notify the user about the real-time air pressure values of the tires 108 and/or the respective required inflation or deflation. In an embodiment of the present disclosure, the microprocessor 402 may also send a time-specific control signal to a relay 404 for supplying required power from a power source 406 the solenoid valve 408 corresponding to the tire 108 that requires inflation or deflation.

Figure 5A:
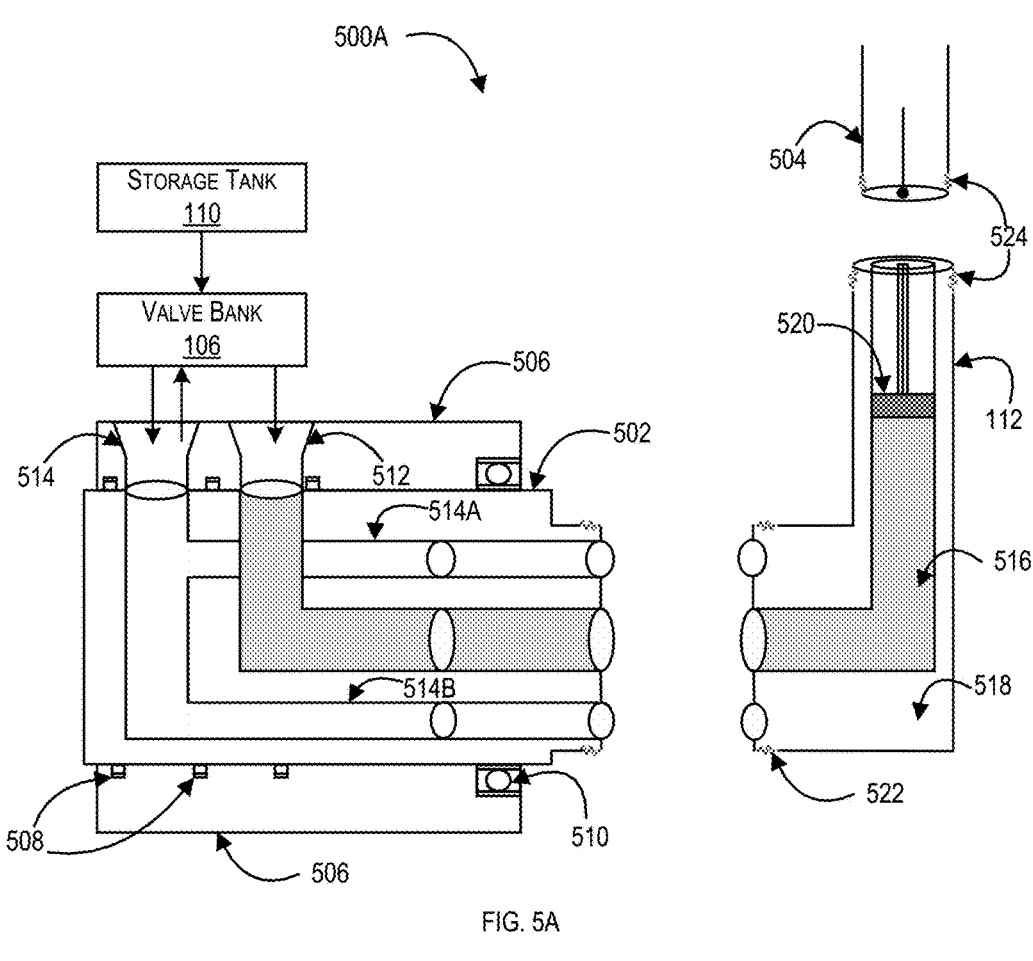
FIG. 5A illustrates an apparatus for inflation and deflation of the tires of the automobile, in accordance with an embodiment of the present disclosure.
Figure 5B:
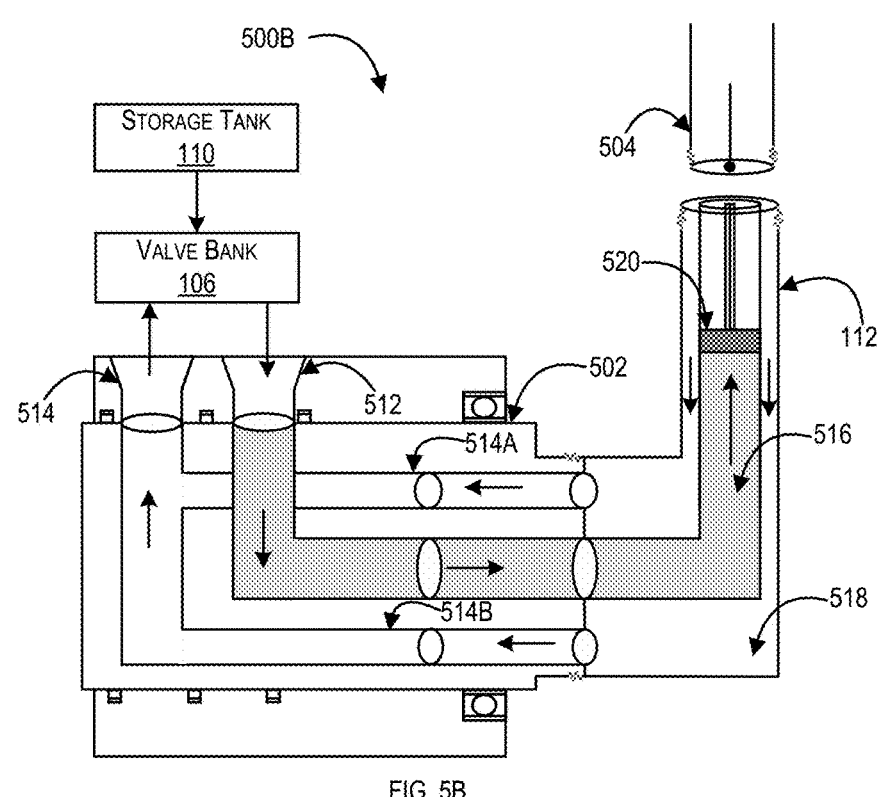
FIG. 5B illustrates an exemplary apparatus during deflation of the tires of the automobile, in accordance with an embodiment of the present disclosure.
Figure 5C:
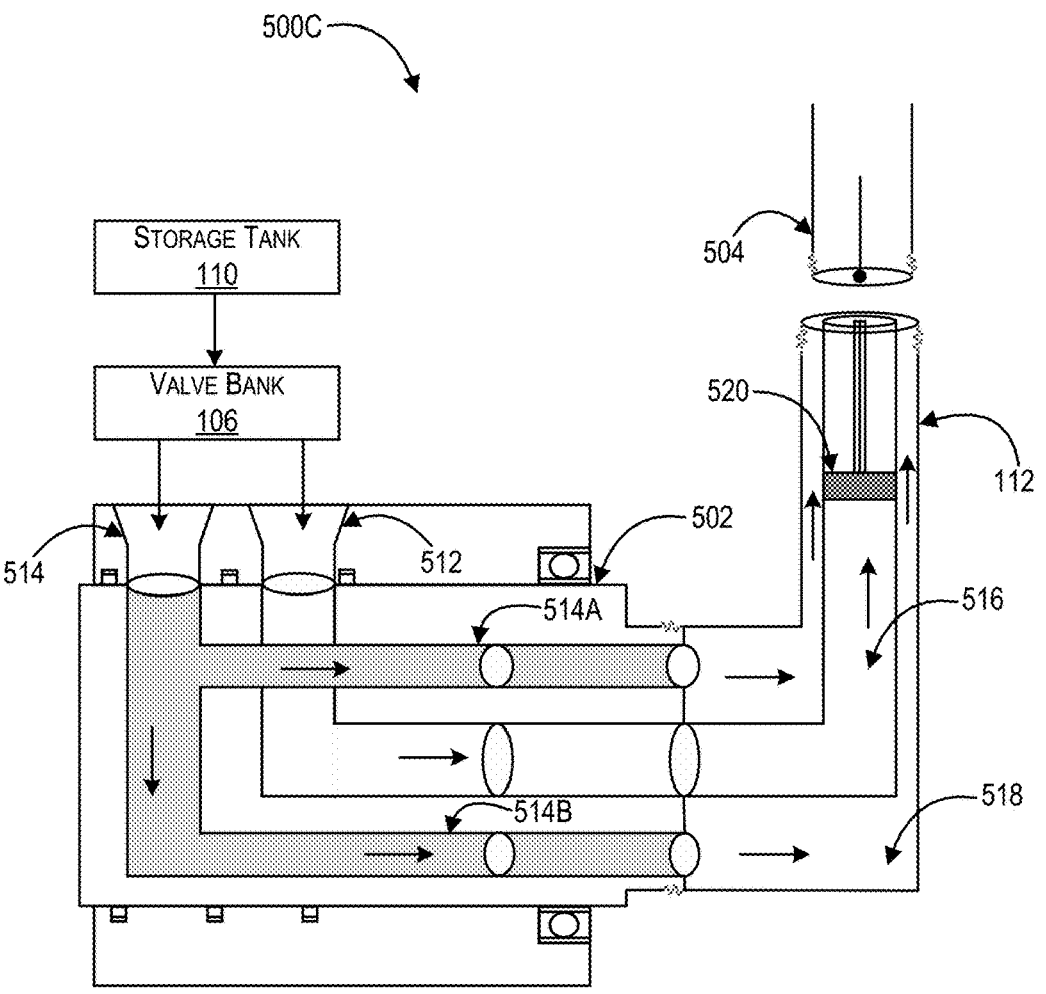
FIG. 5C illustrates an exemplary apparatus during inflation of the tires of the automobile, in accordance with an embodiment of the present disclosure.
Figure 6:
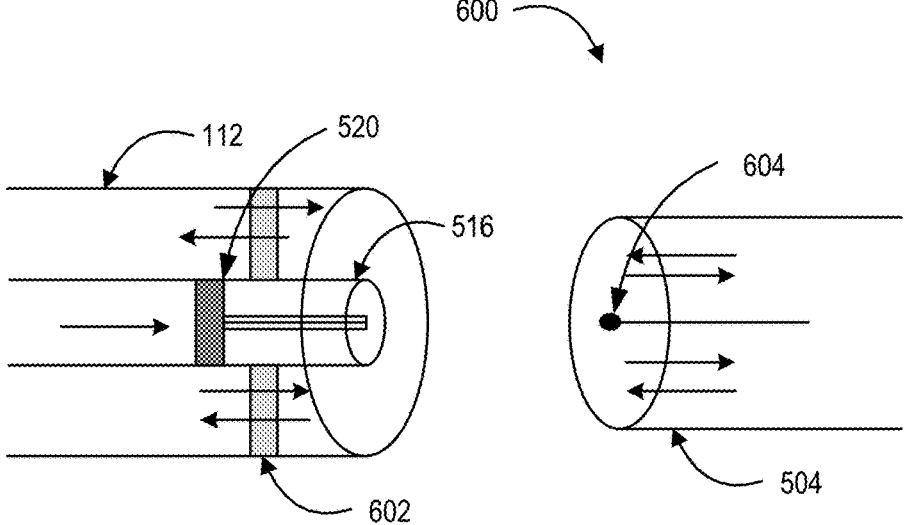
FIG. 6 illustrates an exemplary exploded view of alignment of the air control unit and a valve stem for inflating and deflating the tire, in accordance with an embodiment of the present disclosure.

FIG. 5A illustrates an apparatus 500A for inflation and deflation of the tires 108 of the automobile, in accordance with an embodiment of the present disclosure. FIG. 5B illustrates an exemplary apparatus 500B during deflation of the tires 108 of the automobile, in accordance with an embodiment of the present disclosure. FIG. 5C illustrates an exemplary apparatus 500C during inflation of the tires 108 of the automobile, in accordance with an embodiment of the present disclosure. FIG. 6 illustrates an exemplary exploded view 600 of the alignment of the air control unit 112 and a valve stem 604 for inflating and deflating the tire 108, in accordance with an embodiment of the present disclosure. For the sake of brevity, FIGS. 5A, 5B, 5C, and 6 have been explained together.

In an embodiment of the present disclosure, the apparatus 500 for inflation and deflation of tires 108 of an automobile includes an air pressure source 110 (also termed as storage tank 110), a valve bank 106, a rotating part 502, the air control unit 112, a valve stem 504, a stationary part 506. In some embodiments, the storage tank 110 may store the air for inflation and deflation of the tires 108. Such air may be, without any limitation, be received automatically from the automobile or be manually refilled from a separate cylinder. In some embodiments, the stationary part 506 may be coupled to the valve bank 106, such that the valve bank 106 may control the flow of air into the rotating part 502 via opening and closing the solenoid valve 408 corresponding to the tire 108. The rotating part unit 502 may be affixed onto the stationary part 506 of the automobile with one or more precision ball bearings 510 and a plurality of O-rings 508. The precision ball bearings 510 may reduce friction to ensure smooth rotation of the rotating part and the O-rings 508 may provide a secure seal between the stationary and rotating parts to prevent leakage of air from the rotating part 502.

In some embodiments, the rotating part 502 includes a first air passage 512 and a second air passage 514 that may receive air pressure from the storage tank 110 via the valve bank 106. In one instance, during deflation, only the first air passage 512 may receive the air pressure. In another instance, during inflation, both the first air passage 512 and the second air passage 514 may receive the air pressure. The second air passage 514 may further be divided into two separate passages 514A and 514B for uniform distribution of air pressure during inflation of the tire 108. Further, the rotating part 502 transfers the air pressure from the storage tank 110 to the air control unit 112 of each of the one or more tires 108 based on the controlled flow of air by the one or more solenoid valves 408 of the valve bank 106. In some embodiments, the rotating part 502 and the air control unit 112 of the tire 108 may have the rotary union to facilitate a connection between a stationary end and a rotating end for the smooth and uninterrupted flow of air between the solenoid valve 408 and the tire 108. Such rotary union ensures that the necessary pneumatic connections are maintained between the rotating tire and the stationary chassis. Accordingly, the rotary union allows easy installation and maintenance while providing reliable and efficient operation over a long period of time.

In some embodiments, the air control unit 112 may be installed separately on each tire 108 via one or more pipe supports 602, as shown in FIG. 6. Such air control unit 112 may receive air from the storage tank 110 via the corresponding solenoid valve 408 in the valve bank 106. Further, the air control unit 112 may include a central pipe 516 and a surrounding pipe 518 over the central pipe 516. The central pipe 516 may be coupled to the first air passage 512 of the rotating part 502 to receive air pressure from the corresponding solenoid valve 408 to press a pin 604 of the valve stem 504 of the tire 108. Further, the surrounding pipe 518 may be coupled to the two separate passages 514A and 514B of the second passage 514. In an embodiment of the present disclosure, the central pipe 516 may include a piston 520 that may be aligned with the valve stem 504 of the tire 108, as shown in FIG. 6. It may be noted that the valve stem 504 corresponds to a self-contained valve that allows air to enter or exit the tire 108 to inflate or deflate it, respectively. Further, the valve stem 504 is designed to automatically close and remain sealed by the pressure within the chamber or a spring, or both, to prevent gas from escaping.

For deflation of the tire 108, as shown in FIG. 5B, the corresponding solenoid 408 may pass an air pressure through the first air passage 512 which eventually may pass through the central pipe 516 to move the piston 520 forward to press the pin 604 of the valve stem 504 of the tire 108 to automatically deflate the tire 108 by egressing the air pressure through the surrounding pipe 518. For inflation of the tire 108, as shown in FIG. 5C, the corresponding solenoid valve 408 may pass an air pressure through the first air passage 512 and the second air passage 514 which eventually may pass through the central pipe 516 and the surrounding pipe 518 with a spring element 522. As a result, the air pressure through the central pipe 516 moves the piston 520 forward to press the pin 604 of the valve stem 504 of the tire 108, and the air pressure through the surrounding pipe 518 inflates the tire 108. Additionally, in some embodiments, the air control unit 112 may not utilize the piston 520 for pressing the pin 604 of the valve stem 504 that may be pressed directly by a high air pressure for inflation and deflation, as elaborated above.

Figures 7, 8, 9, 10A:
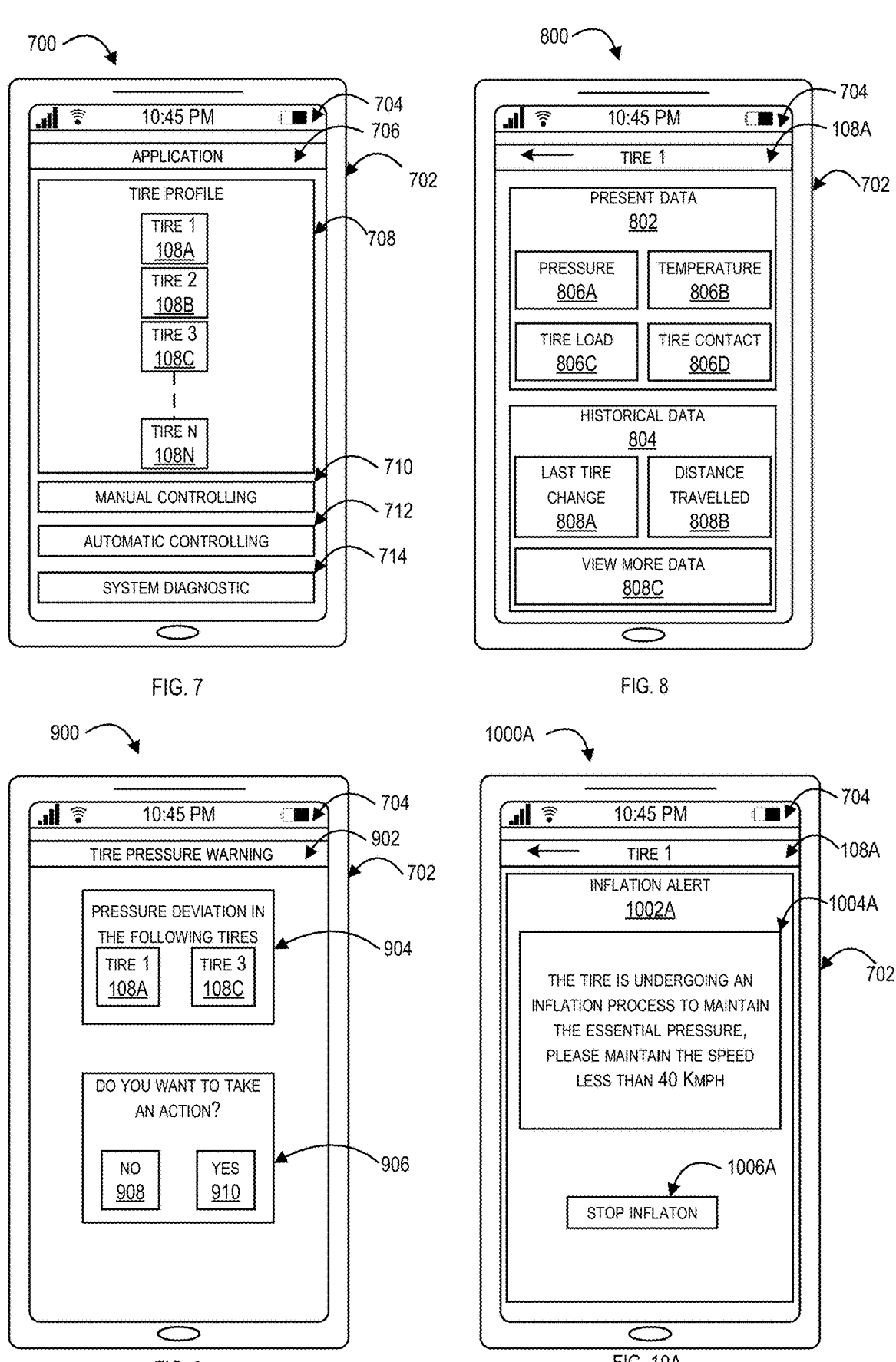

FIGS. 7-13 illustrate various exemplary implementations 700, 800, 900, 1000A, 1000B, 1100, 1200, and 1300 of a tire management application 706, in accordance with an embodiment of the present disclosure. In some embodiments, the user may log into a user device 702 such as mobile phone and dashboard of the automobile, and access the tire management application 706 for managing the one or more tires 108 of the automobile. In an illustrated embodiment, as shown in FIG. 7, the user device 702 may render an interface 704 with an option 708 to the user to check profiles of the one or more tires 108A, 108B, 108C, . . . 108N, an option 710 for manually controlling the air pressure of the tires 108, an option 712 for automatically controlling the air pressure of the tires 108, and an option 714 to run system diagnostic.

Figures 10B, 11, 12, 13:
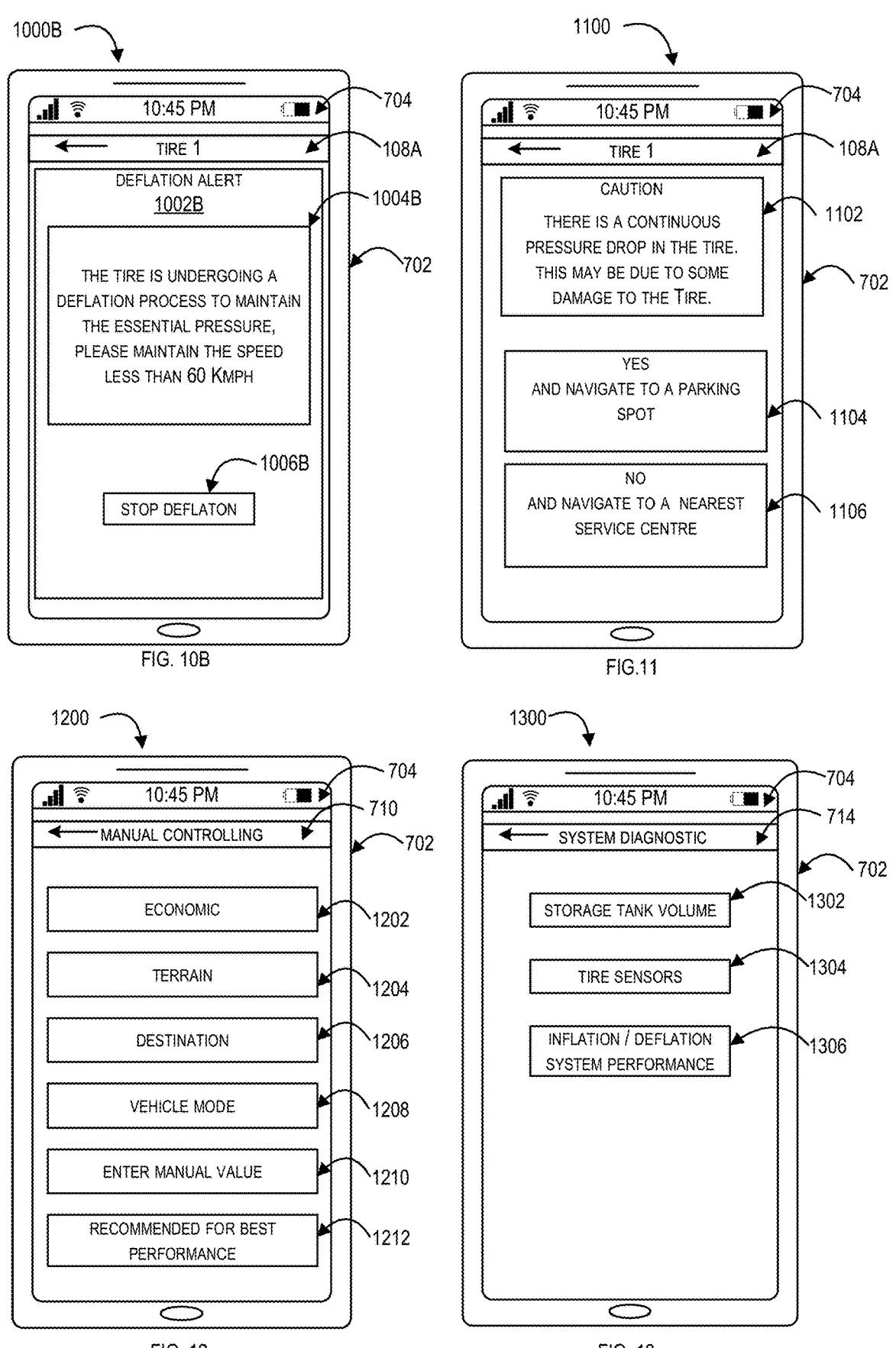

Further, when the user selects an option 710 to view the tire profile 708 of tire 1 108A, then the tire management application 706 may render, as shown in FIG. 8, an option 802 to view present data and an option 804 to view historical data of the tire 108A. The present data may, without any limitation, include pressure 806A, temperature 806B, tire load 806C, and tire contact 806D. Further, the historical data may, without any limitation, include last tire change 808A, distance travelled 808B, and other historical data option 808C. In some embodiments, when a pressure deviation is observed in one or more tires 108, then the tire management application 706 may render, as shown in FIG. 9, a tire pressure warning 902 with details of the one or more tires 108 that have pressure deviation, as shown by 904. Further, the tire management application 706 may also facilitate the user with an option 906 to take an action 910 or not 908, such as initiate inflation or deflation. In some embodiments, during inflation of the one or more tires 108, the tire management application 706 may render, as shown in FIG. 10A, an inflation alert 1002A to prompt the user that the inflation of the tires 108 is ongoing and a pre-determined speed shall be maintained during the inflation. For example, as illustrated in a block 1004A, the inflation alert 1002A may be 'The tire is undergoing an inflation process to maintain the essential pressure, please maintain the speed less than 40 Kmph'. Further, the tire management application 706 may also facilitate the user with an option 1006A to stop inflation based on user preference. In some embodiments, during deflation of the one or more tires 108, the tire management application 706 may render, as shown in FIG. 10B, a deflation alert 1002B to prompt the user that the deflation of the tires 108 is ongoing and a pre-determined speed shall be maintained during the deflation. For example, as illustrated in a block 1004B, the deflation alert 1002B may be 'The tire is undergoing a deflation process to maintain the essential pressure, please maintain the speed less than 60 Kmph'. Further, the tire management application 706 may also facilitate the user with an option 1006B to stop deflation based on user preference.

In some embodiments, when a continuous pressure drop is observed in one or more tires 108, then the tire management application 706 may render, as shown in FIG. 11, a corresponding caution 1102 that such pressure drop may be due to some damage to the tire 108, such as tire puncture. Further, the tire management application 706 may also facilitate the user with an option 1104 to navigate to a parking spot and an option 1106 to navigate to a nearest service centre, such that the user may change the tire 108 manually or get that tire fixed 108, respectively. In some embodiments, the user may select the option 710 for manually controlling the air pressure of the tires 108 to manually select the air pressure that must be maintained in the tires 108. For such selection, the tire management application 706 may facilitate, as shown in FIG. 12, user with one or more options, such as an option 1202 to set the air pressure for best economy, an option 1204 to set the air pressure based on a type of terrain, an option 1206 to set the air pressure based on the destination such as distance, an option 1208 to set the air pressure based on the selected vehicle mode such as sports mode or city mode, an option 1210 to manually enter the required air pressure value in the one or more tires 108, an option 1212 to set the air pressure value of the one or more tires 108 for best performance based on one or more criteria, as mentioned above. In some embodiments, the user may select the option 714 to run system diagnostic to check status of one or more components of the automated system 100 and the apparatus 500. For such selection, the tire management application 706 may facilitate, as shown in FIG. 13, user with one or more details, such as storage tank volume 1302, status and/or condition of the tire sensors 1304, and the performance percentage 1306 of the automated system 100.

FIG. 14 illustrates a flowchart 1400 of an automated method for inflation and deflation of tires of an automobile, in accordance with an embodiment of the present disclosure. The method starts at step 1402.

At first, real-time air pressure data from one or more tires of the automobile may be received, at step 1404. Next, at step 1406, an optimum air pressure for each of the one or more tires of the automobile may be determined based on the user data, automobile data, or a combination thereof. Next, at step 1408, the received real-time air pressure with the determined optimum air pressure for each of the one or more tires may be compared to determined a required inflation or a required deflation for the one or more tires of the automobile. Thereafter, at step 1410, one or more solenoid valves corresponding to the one or more tires may be controlled based on the results of comparison for the required inflation and the required deflation of the one or more tires of the automobile via respective air control units having a central pipe and a surrounding pipe over the central pipe. In one embodiment, for deflation of a tire, the corresponding solenoid valve passes an air pressure through the central pipe to press a valve stem of the tire, such that the air pressure from the tire egresses via the surrounding pipe. In another embodiment, for inflation of the tire, the corresponding solenoid valves pass an air pressure through both the central pipe and the surrounding pipe to press the valve stem and refill the air, respectively.

In some embodiments, the method further includes the steps of determining the one or more solenoid valves of a valve bank that needs to be controlled based on the results of the comparison. The method also includes the steps of providing one or more notifications to a user via an application installed on a user device and/or a dashboard system of the automobile. The one or more notifications are associated with the received real-time air pressure of the one or more times of the automobiles, details about the inflation and deflation, manually controlling the inflation and deflation, issues with the one or more tires, optimum speeds to be maintained during the inflation and deflation, or a combination thereof. The method ends at step 1412.

Figure 15:
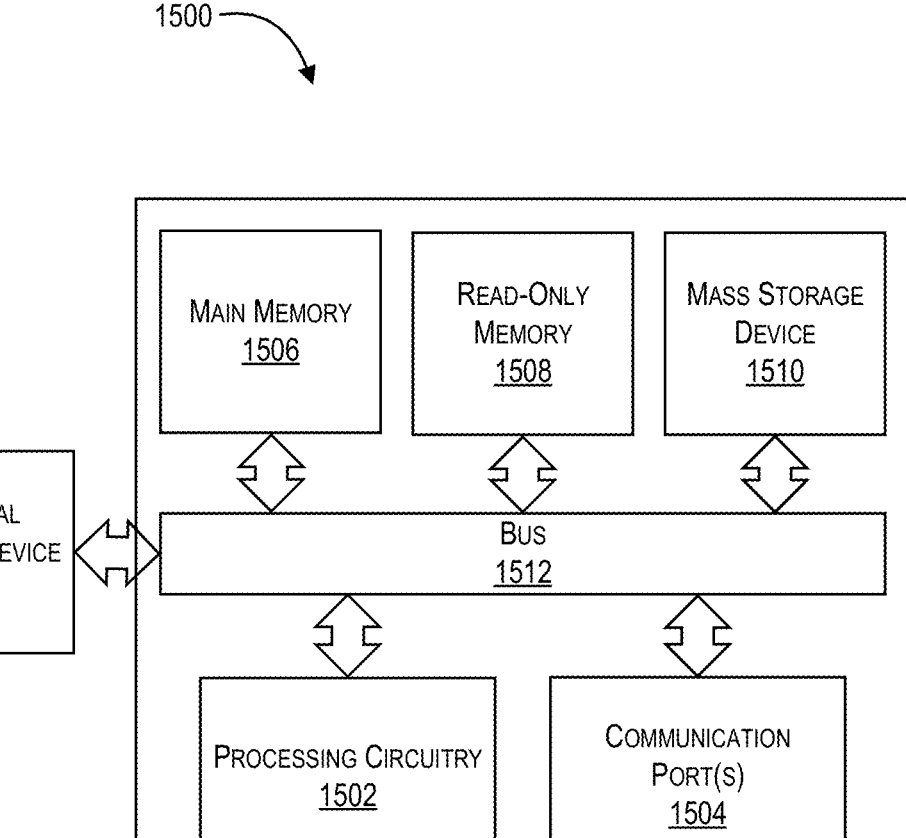
FIG. 15 illustrates an exemplary computer system in which or with which embodiment of the present disclosure may be utilized.

FIG. 15 illustrates an exemplary computer system in which or with which embodiments of the present disclosure may be utilized. As shown in FIG. 15, a computer system 1500 includes an external storage device 1514, a bus 1512, a main memory 1506, a read-only memory 1508, a mass storage device 1510, a communication port 1504, and a processor 1502.

Those skilled in the art will appreciate that computer system 1500 may include more than one processor 1502 and communication ports 1504. Examples of processor 1502 include, but are not limited to, an Intel® Itanium® or Itanium 2 processor(s), or AMD® Opteron® or Athlon MP® processor(s), Motorola® lines of processors, Forti-SOC™ system on chip processors or other future processors. The processor 1502 may include various modules associated with embodiments of the present disclosure.

The communication port 1504 can be any of an RS-232 port for use with a modem-based dialup connection, a 10/100 Ethernet port, a Gigabit or 10 Gigabit port using copper or fiber, a serial port, a parallel port, or other existing or future ports. The communication port 1504 may be chosen depending on a network, such as a Local Area Network (LAN), Wide Area Network (WAN), or any network to which the computer system connects.

The memory 1506 can be Random Access Memory (RAM), or any other dynamic storage device commonly known in the art. Read-Only Memory 1506 can be any static storage device(s) e.g., but not limited to, a Programmable Read-Only Memory (PROM) chips for storing static information e.g. start-up or BIOS instructions for processor 1502.

The mass storage 1510 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 1512 communicatively couples processor(s) 1502 with the other memory, storage, and communication blocks. The bus 1512 can be, e.g. a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1502 to a software system.

Optionally, operator and administrative interfaces, e.g. a display, keyboard, and a cursor control device, may also be coupled to bus 804 to support direct operator interaction with the computer system. Other operator and administrative interfaces can be provided through network connections connected through communication port 1504. An external storage device 1514 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

What is claimed is:

1. A system for automatic inflation and deflation of tires of an automobile, the automated system comprising:

a receiver module to receive real-time air pressure data from one or more tires of the automobile through a respective sensor installed in each of the one or more tires;

an analyzer module to:

determine an optimum air pressure for each of the one or more tires of the automobile based at least on one of: user data and automobile data;

compare the received real-time air pressure with the determined optimum air pressure for each of the one or more tires to determine at least one of: a required inflation and a required deflation for the one or more tires of the automobile; and a control module to control, based on the results of comparison, one or more solenoid valves corresponding to the one or more tires for at least one of: the required inflation and the required deflation of the one or more tires of the automobile through respective air control units having a central pipe and a surrounding pipe over the central pipe, wherein for deflation of the tire, the corresponding solenoid valve passes an air pressure through the central pipe to press a valve stem of the tire, such that the air pressure from the tire egresses through the surrounding pipe; and wherein for inflation of the tire, the corresponding solenoid valves passes an air pressure through both the central pipe and the surrounding pipe to press the valve stem and refill the air, respectively.

2. The automated system of claim 1, wherein the air control unit includes a piston inside the central pipe that is aligned with the valve stem of the tire, such that when the corresponding solenoid valve passes the air pressure through the central pipe then the piston moves forward to press the valve stem of the tire that automatically deflates the tire by egressing the air pressure through the surrounding pipe.

3. The automated system of claim 2, wherein during the inflation, the corresponding solenoid valve passes the air pressure through the central pipe and the surrounding pipe, such that the air pressure through the central pipe moves the piston forward to press the valve stem of the tire, and the air pressure through the surrounding pipe inflates the tire.

4. The automated system of claim 1, wherein the automobile corresponds a vehicle having one or more wheels and includes at least one of: a bike, a scooter, an auto-rickshaw, a car, a truck, and a bus.

5. The automated system of claim 1, wherein the user data includes at least one of: a desired air pressure value, a terrain type, a potential distance to be travelled, and a driving mode of the automobile.

6. The automated system of claim 1, wherein the automobile data includes at least one of: historical values of air pressure in the tires, a predetermined threshold air pressure value for the tires, a driving mode of the automobile, a real-time automobile speed, details pertaining to tire-ground contact, real-time Global Positioning System (GPS) coordinates of the automobile, real-time weather details, and details pertaining to destination of journey.

7. The automated system of claim 1, wherein determining the optimum air pressure for each of the one or more tires of the automobile includes at least one of:

employing an Artificial Intelligence (AI) model over one of: the received automobile data and the user data; and fetching, from a database, a pre-stored optimum air pressure for each of the one or more tires based on one of: the received automobile data and the user data.

8. The automated system of claim 1, wherein the analyzer module further determines that a tire needs inflation and deflation when the received real-time air pressure is less and more than the optimum air pressure value, respectively.

9. The automated system of claim 8, wherein the required inflation and the required deflation is a difference between the received real-time air pressure and the determined optimum air pressure for each of the one or more tires.

10. The automated system of claim 1, further comprises a decision module to determine the one or more solenoid valves of a valve bank that needs to be controlled based on the results of the comparison.

11. The automated system of claim 1, further comprises a notification module to provide one or more notification to a user through an application installed on at least one of: a user device and a dashboard system of the automobile, wherein the one or more notification are associated with at least one of: the received real-time air pressure of the one or more tires of the automobiles, details about the inflation and deflation, manually controlling the inflation and deflation, issues with the one or more tires, optimum speeds to be maintained during the inflation and deflation.

12. An apparatus for inflation and deflation of tires of an automobile, the apparatus comprising:

an air pressure source to store the air for inflation and deflation of the tires;

a valve bank having a solenoid valve for each tire of the automobile, wherein the solenoid valve controls the flow of air from the air pressure source based on a control signal received from a system for automatic inflation and deflation of tires;

an air control unit installed on each tire of the automobile to receive air from the air pressure source through the corresponding solenoid valve, wherein the air control unit further comprises:

a central pipe to receive air pressure from the corresponding solenoid valve to press a valve stem of the tire; and a surrounding pipe over the central pipe to facilitate ingress and egress of air into the tire and out of the tire for inflation and deflation, respectively, wherein for deflation of a tire, the corresponding solenoid valve passes an air pressure through the central pipe to press a valve stem of the tire, such that the air pressure from the tire egresses through the surrounding pipe; and wherein for inflation of the tire, the corresponding solenoid valves passes an air pressure through both the central pipe and the surrounding pipe to press the valve stem and refill the air.

13. The apparatus of claim 12, wherein the central pipe includes a piston that is aligned with the valve stem of the tire, such that when the corresponding solenoid valve passes the air pressure through the central pipe then the piston moves forward to press the valve stem of the tire that automatically deflates the tire by egressing the air pressure through the surrounding pipe.

14. The apparatus of claim 13, wherein during the inflation, the corresponding solenoid valve passes the air pressure through the central pipe and the surrounding pipe, such that the air pressure through the central pipe moves the piston forward to press the valve stem of the tire, and the air pressure through the surrounding pipe inflates the tire.

15. The apparatus of claim 12, further comprises a connecting unit to transfer the air pressure from the air pressure source to the air control unit of each of the one or more tires based on the controlled flow of air by the one or more solenoid valves of the valve bank.

16. The apparatus of claim 15, wherein the connecting unit and the air control unit of the tire have a rotary union to facilitate a connection between a stationary end and a rotating end for the uninterrupted flow of air between the solenoid valve and the tire.

17. The apparatus of claim 12, wherein the system for automatic inflation and deflation of tires further comprises:

a receiver module to receive real-time air pressure data from the one or more tires of the automobile through a respective sensor installed in each of the one or more tires;

an analyzer module to:

determine an optimum air pressure for each of the one or more tires of the automobile based at least on one of: user data and automobile data;

compare the received real-time air pressure with the determined optimum air pressure for each of the one or more tires to determine at least one of: a required inflation and a required deflation for the one or more tires of the automobile; and a control module to control, based on the results of comparison, the one or more solenoid valves corresponding to the one or more tires for at least one of: the required inflation and the required deflation of the one or more tires of the automobile through respective air control units.

18. The apparatus of claim 17, wherein the user data includes at least one of: a desired air pressure value, a terrain type, a potential distance to be travelled, and a driving mode of the automobile; and wherein the automobile data includes at least one of: historical values of air pressure in the tires, a predetermined threshold air pressure value for the tires, a driving mode of the automobile, a real-time automobile speed, details pertaining to tire-ground contact, real-time Global Positioning System (GPS) co-ordinates of the automobile, real-time weather details, and details pertaining to destination of journey.

19. The apparatus of claim 12, wherein determining the optimum air pressure for each of the one or more tires of the automobile includes at least one of:

employing an Artificial Intelligence (AI) model over one of: the received automobile data and the user data; and fetching, from a database, a pre-stored optimum air pressure for each of the one or more tires based on one of: the received automobile data and the user data.

20. The apparatus of claim 17, wherein the analyzer module further determines that a tire needs inflation and deflation when the received real-time air pressure is less and more than the optimum air pressure value, respectively;

wherein the required inflation and the required deflation is a difference between of the received real-time air pressure and the determined optimum air pressure for each of the one or more tires.

* * * * *